United States Patent
Kawase

(10) Patent No.: US 12,200,352 B2
(45) Date of Patent: *Jan. 14, 2025

(54) INFORMATION PROCESSING APPARATUS, INFORMATION PROCESSING METHOD, AND NON-TRANSITORY STORAGE MEDIUM

(71) Applicant: NEC Corporation, Tokyo (JP)

(72) Inventor: Nobuaki Kawase, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/994,608

(22) Filed: Nov. 28, 2022

(65) Prior Publication Data

US 2023/0088964 A1 Mar. 23, 2023

Related U.S. Application Data

(63) Continuation of application No. 16/623,473, filed as application No. PCT/JP2018/000242 on Jan. 10, 2018, now Pat. No. 11,659,273.

(30) Foreign Application Priority Data

Jun. 22, 2017 (JP) .................. 2017-122500

(51) Int. Cl.
*H04N 23/63* (2023.01)
*G06F 16/583* (2019.01)
(Continued)

(52) U.S. Cl.
CPC ......... *H04N 23/633* (2023.01); *G06F 16/583* (2019.01); *G06V 40/165* (2022.01); *H04W 4/80* (2018.02)

(58) Field of Classification Search
CPC ..... H04N 23/633; H04W 4/80; G06F 16/583; G06V 40/165
See application file for complete search history.

(56) References Cited

U.S. PATENT DOCUMENTS

| 6,035,055 A | 3/2000 | Wang | G06F 16/5838 |
| | | | 707/E17.023 |
| 11,659,273 B2 * | 5/2023 | Kawase | H04W 4/80 |
| | | | 348/333.02 |

(Continued)

FOREIGN PATENT DOCUMENTS

| JP | 2002-024229 A | 1/2002 |
| JP | 2002-320172 A | 10/2002 |

(Continued)

OTHER PUBLICATIONS

International Search Report for PCT Application No. PCT/JP2018/000242, mailed on Apr. 10, 2018.

(Continued)

*Primary Examiner* — Twyler L Haskins
*Assistant Examiner* — Fayez A Bhuiyan
(74) *Attorney, Agent, or Firm* — Sughrue Mion, PLLC

(57) ABSTRACT

According to the present invention, there is provided an information processing apparatus (10) including: an obtainment unit (12) which obtains a reference image; an extraction unit (13) which extracts, from a storage unit (11) which stores a provision image generated by a plurality of provision-image generation cameras installed in a facility, the provision image including a person included in the reference image; and a display control unit (14) which causes a display to display the provision image extracted by the extraction unit (13).

12 Claims, 8 Drawing Sheets

(51) Int. Cl.
    *G06V 40/16*     (2022.01)
    *H04W 4/80*     (2018.01)

(56) References Cited

U.S. PATENT DOCUMENTS

| | | |
|---|---|---|
| 2002/0049728 A1 | 4/2002 | Kaku |
| 2004/0156535 A1 | 8/2004 | Goldberg et al. |
| 2009/0304238 A1* | 12/2009 | Ebata ................ H04N 1/0044 |
| | | 382/118 |
| 2014/0063280 A1 | 3/2014 | Tokimoto |
| 2019/0057249 A1* | 2/2019 | Hayase ............... G06V 40/168 |

FOREIGN PATENT DOCUMENTS

| | | |
|---|---|---|
| JP | 2006-523334 A | 10/2006 |
| JP | 2007-287014 A | 11/2007 |
| JP | 2008-198135 A | 8/2008 |
| JP | 2009-010576 A | 1/2009 |
| JP | 2009-087004 A | 4/2009 |
| JP | 2009-278534 A | 11/2009 |
| JP | 2014-053749 A | 3/2014 |

OTHER PUBLICATIONS

International Preliminary Report on Patentability for PCT Application No. PCT/JP2018/000242, dated Jul. 4, 2019.

* cited by examiner

FIG. 5

| PROVISION IMAGE FILE ID | FACIAL FEATURE VALUE | IDENTIFICATION INFORMATION |
|---|---|---|
| A000001 | (····), (···), ·· | 19321, 21289, ···· |
| A000002 | (·····) | 21321, |
| ⋮ | ⋮ | ⋮ |

INFORMATION PROCESSING APPARATUS, INFORMATION PROCESSING METHOD, AND NON-TRANSITORY STORAGE MEDIUM

The present application is a continuation application of U.S. patent application Ser. No. 16/623,473 filed on Dec. 17, 2019, which is a National Stage Entry of international application No. PCT/JP2018/000242 filed on Jan. 10, 2018, which claims the benefit of priority from Japanese Patent Application No. 2017-122500 filed on Jun. 22, 2017, the disclosures of all of which are incorporated in their entirety by reference herein.

TECHNICAL FIELD

The present invention relates to an information processing apparatus, an information processing method, and a program.

BACKGROUND ART

Patent Document 1 discloses a camera including an imaging unit, an image storage unit which stores images obtained by capturing by the imaging unit, and a target object selection unit which selects a target object in the images obtained by capturing by the imaging unit, and an image extraction unit which extracts an image corresponding to the selected target object from the stored captured image.

Patent Document 2 discloses a technology of a photos-for-distribution creation apparatus for the purpose of easily distributing a snapshot imaged at a wedding reception or the like. The photos-for-distribution creation apparatus includes a unit which images the face of a visitor and generates a visitor database, a unit which collects a captured image obtained by asking the visitor to photograph, a unit which collates the visitor database with a face area of the captured image and associates the captured image for each person included in the visitor database, and a unit which records the captured image associated with each person included in the visitor database on a storage medium.

RELATED DOCUMENT

Patent Document

[Patent Document 1] Japanese Laid-open Patent Application Publication No. 2014-53749
[Patent Document 2] Japanese Laid-open Patent Application Publication No. 2009-10576

SUMMARY OF THE INVENTION

Technical Problem

In a facility such as a theme park or the like, a service, in which visitors are imaged with a plurality of cameras installed in the facility and the imaged images are provided to the visitors, is provided.

For example, the facility side provides a state in which the visitors can browse the captured image. Then, the visitor finds a desired image (for example, one in which the visitor or a family of the visitor is included) among the browsable images, and performs a procedure such as a purchase or the like. Such a service has the following problems.

The more images captured by a plurality of cameras, the higher probability that the images which the visitors want to purchase are provided. On the other hand, the greater the number of captured images, the greater the effort of the visitor who finds a desired image among the captured images is increased.

An object of the present invention is to provide an information processing apparatus, an information processing method, and a program capable of extracting and presenting an image suitable for each visitor among images generated by a plurality of cameras installed in a facility.

Solution to Problem

According to the present invention, there is provided an information processing apparatus including: an obtainment unit which obtains a reference image; an extraction unit which extracts, from a storage unit which stores a provision image generated by a plurality of provision-image generation cameras installed in a facility, the provision image including a person included in the reference image; and a display control unit which causes a display to display the provision image extracted by the extraction unit.

In addition, according to the present invention, there is provided an information processing apparatus including: an obtainment unit which obtains a first image generated by a first camera in association with one or a plurality of pieces of identification information obtained by a wireless communication apparatus which is installed in a periphery of the first camera and obtains the identification information from one or a plurality of electronic tags or portable terminals of which a positional relationship satisfies a predetermined condition; and an extraction unit which extracts a second image, generated by a plurality of second cameras, including a person included in the first image and being associated with the identification information obtained by the obtainment unit, from a storage unit which stores the second image in association with the one or the plurality of pieces of identification information obtained by a wireless communication apparatus which is installed in a periphery of each of the plurality of second cameras and obtains the identification information from the one or the plurality of electronic tags or portable terminals of which a positional relationship satisfies a predetermined condition.

In addition, according to the present invention, there is provided an information processing method executed by a computer, the method including: an obtainment step of obtaining a reference image; an extraction step of extracting, from a storage unit which stores a provision image generated by a plurality of provision-image generation cameras installed in a facility, the provision image including a person included in the reference image; and a display control step of causing a display to display the provision image extracted in the extraction step.

In addition, according to the present invention, there is provided a program causing a computer to function as: an obtainment unit which obtains a reference image; an extraction unit which extracts, from a storage unit which stores a provision image generated by a plurality of provision-image generation cameras installed in a facility, the provision image including a person included in the reference image; and a display control unit which causes a display to display the provision image extracted by the extraction unit.

In addition, according to the present invention, there is provided an information processing method executed by a computer, the method including: an obtainment step of obtaining a first image generated by a first camera in association with one or a plurality of pieces of identification information obtained by a wireless communication apparatus which is installed in a periphery of the first camera and obtains the identification information from one or a plurality of electronic tags or portable terminals of which a positional relationship satisfies a predetermined condition; and an extraction step of extracting a second image, generated by a plurality of second cameras, including a person included in the first image and being associated with the identification information obtained in the obtainment step, from a storage unit which stores the second image in association with the one or the plurality of pieces of identification information obtained by a wireless communication apparatus which is installed in a periphery of each of the plurality of second cameras and obtains the identification information from the one or the plurality of electronic tags or portable terminals of which a positional relationship satisfies a predetermined condition.

In addition, according to the present invention, there is provided a program causing a computer to function as: an obtainment unit which obtains a first image generated by a first camera in association with one or a plurality of pieces of identification information obtained by a wireless communication apparatus which is installed in a periphery of the first camera and obtains the identification information from one or a plurality of electronic tags or portable terminals of which a positional relationship satisfies a predetermined condition; and an extraction unit which extracts a second image, generated by a plurality of second cameras, including a person included in the first image and being associated with the identification information obtained by the obtainment unit, from a storage unit which stores the second image in association with the one or the plurality of pieces of identification information obtained by a wireless communication apparatus which is installed in a periphery of each of the plurality of second cameras and obtains the identification information from the one or the plurality of electronic tags or portable terminals of which a positional relationship satisfies a predetermined condition.

Advantageous Effects of Invention

According to the present invention, it is possible to extract and present image data suitable for each visitor among image data generated by a plurality of cameras installed in a facility.

BRIEF DESCRIPTION OF THE DRAWINGS

The above objects and other objects, features and advantages will become more apparent from the following description of the preferred example embodiments and the accompanying drawings.

FIG. 5 is a diagram schematically illustrating an example of data generated by the information processing apparatus according to the present example embodiment.

DESCRIPTION OF EMBODIMENTS

First Example Embodiment

Figure 1:
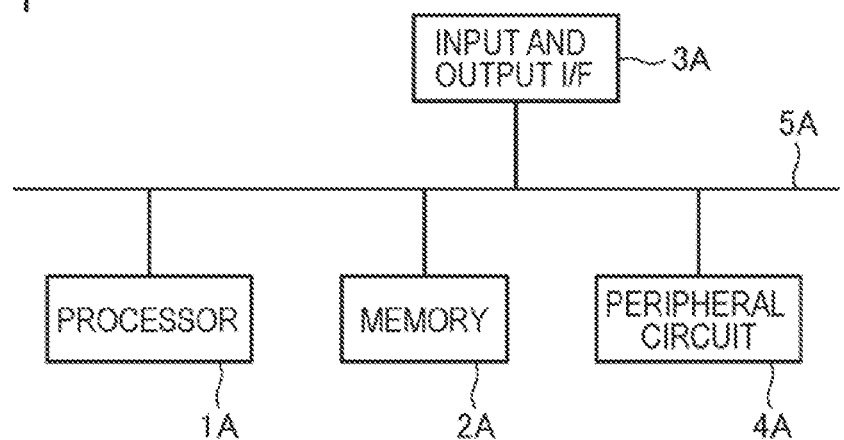
FIG. 1 is a diagram illustrating an example of a hardware configuration of an information processing apparatus according to the present example embodiment.

First, an overview of an information processing system according to the present example embodiment will be described. The information processing system of the present example embodiment is used in an amusement facility where a large number of people are gathered, such as a theme park, a passenger ship, and the like.

The information processing system includes a plurality of provision-image generation cameras, a storage unit, one or a plurality of browsing operation terminals, and an information processing apparatus.

The provision-image generation camera is a camera which images a visitor having fun in the facility. The plurality of provision-image generation cameras are installed at different positions in the facility and are scattered in the facility.

The storage unit stores a plurality of provision images generated by the plurality of provision-image generation cameras.

The browsing operation terminal is a terminal operated by a visitor who wants to browse images captured in the facility (images captured by the provision-image generation camera). The one or the plurality of browsing operation terminals are installed at any positions in the facility. The browsing operation terminal includes a reference-image generation camera, a display, and an input apparatus (for example, a touch panel display, a physical button, a microphone, or the like) which receives a user input.

The reference-image generation camera is positioned in a periphery of the browsing operation terminal (a location where a person operating the browsing operation terminal can be imaged), and images the person operating the browsing operation terminal. The reference-image generation camera images, for example, the periphery of the display (a location where the person operating the browsing operation terminal exists). The display displays an image captured in the facility. The input apparatus receives various inputs from visitors.

The information processing apparatus includes an obtainment unit, an extraction unit, and a display control unit. The obtainment unit obtains a reference image generated by the reference-image generation camera. The extraction unit extracts a provision image including a person included in the reference image from the storage unit. The display control unit displays the provision image extracted by the extraction unit on a display of the browsing operation terminal.

It should be noted that, after displaying the image on the display by using a predetermined provision image according to control of the information processing apparatus, the browsing operation terminal receives an operation for selecting one or a plurality of images among the displayed images as an object of purchase, an operation for receiving the image (for example, specification of printing out at the place, transmitting electronic data to a predetermined e-mail address, or the like), a payment operation (for example, input of cash, card settlement, or the like), or the like.

According to such an information processing system, an image (an image determined to include each visitor by image analysis) suitable for each visitor from among enormous images generated by the plurality of cameras installed in the facility can be extracted and presented.

It should be noted that, the provision-image generation camera and the browsing operation terminal included in the information processing system of the present example embodiment can be realized in accordance with the related art. Hereinafter, a configuration of the information processing apparatus will be described in detail.

First, an example of a hardware configuration of the information processing apparatus will be described. Each of functional units included in the information processing apparatus of the present example embodiment can be configured with any combination of hardware and software on the basis of a central processing unit (CPU) of any computer, a memory, a program loaded in the memory, a storage unit (capable of storing, in addition to the program stored from a stage of shipping the apparatus in advance, a program downloaded from a storage medium such as a compact disc (CD) or a server on the internet) such as a hard disc storing the program, and a network connection interface. Those skilled in the art understand that there are various modifications to a configuration method thereof and the apparatus.

FIG. 1 is a block diagram illustrating a hardware configuration of the information processing apparatus of the present example embodiment. As illustrated in FIG. 1, the information processing apparatus includes a processor 1A, a memory 2A, an input and output interface 3A, a peripheral circuit 4A, and a bus 5A. The peripheral circuit 4A includes various modules. It should be noted that, the information processing apparatus may be configured with a plurality of apparatuses physically or logically divided. In this case, each of the plurality of apparatuses may include the processor 1A, the memory 2A, the input and output interface 3A, the peripheral circuit 4A, and the bus 5A.

The bus 5A is a data transmission path through which the processor 1A, the memory 2A, the peripheral circuit 4A and, the input and output interface 3A transmit and receive data from one another. The processor 1A is an arithmetic processing apparatus such as a CPU or a graphics processing unit (GPU). The memory 2A is a memory such as a random access memory (RAM) or a read only memory (ROM), for example. The input and output interface 3A includes an interface for obtaining information from an input apparatus (for example, a keyboard, a mouse, a microphone, a physical key, a touch panel display, a code reader, or the like), an external apparatus, an external server, an external sensor, and the like and an interface for outputting the information from an output apparatus (for example, a display, a speaker, a printer, a mailer, or the like), the external apparatus, the external server, and the like. The processor 1A can issue a command to each of the modules and perform a calculation based on calculation results thereof.

Figure 2:
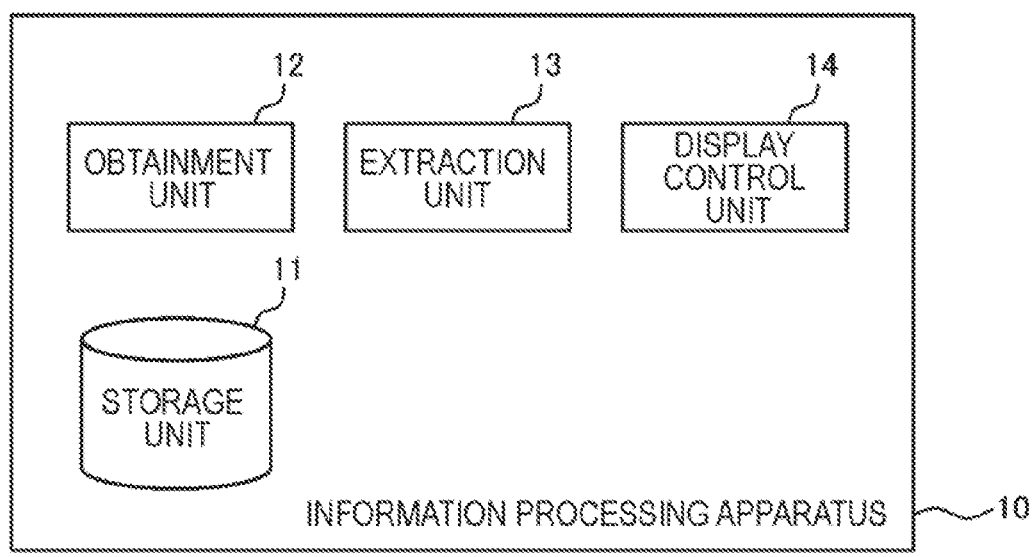
FIG. 2 is an example of a functional block diagram of the information processing apparatus according to the present example embodiment.
Figure 6:
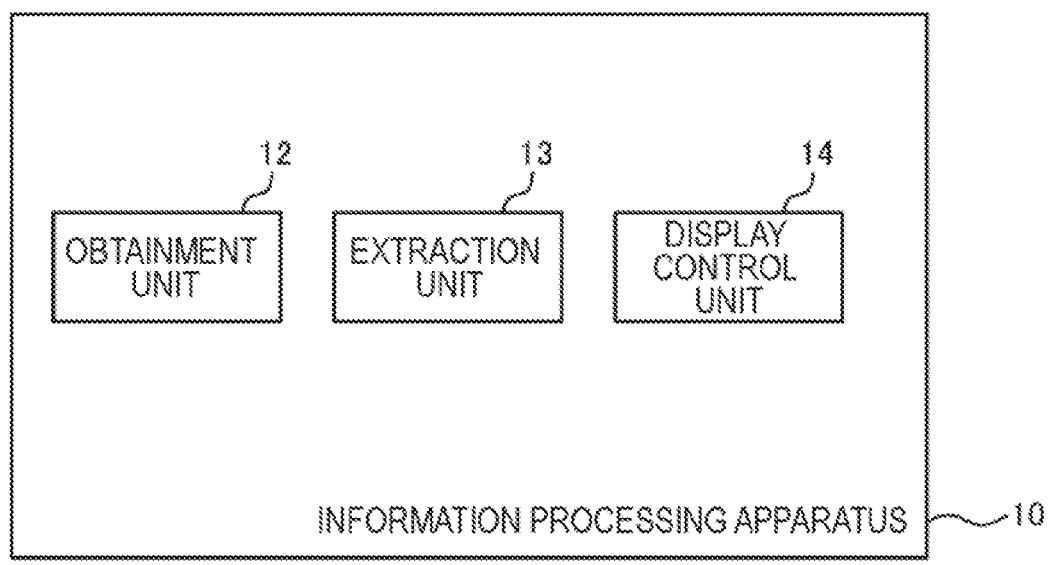
FIG. 6 is an example of another functional block diagram of the information processing apparatus according to the present example embodiment.

Next, a functional configuration of the information processing apparatus will be described. FIGS. 2 and 6 illustrate examples of a functional block diagram of an information processing apparatus 10. As illustrated in FIG. 2, the information processing apparatus 10 includes a storage unit 11, an obtainment unit 12, an extraction unit 13, and a display control unit 14. It should be noted that, as illustrated in FIG. 6, the information processing apparatus 10 may be configured not to include the storage unit 11. In this case, an external apparatus includes the storage unit 11 and is configured to be accessible from the information processing apparatus 10 to the storage unit 11.

The storage unit 11 stores provision image data (a provision image) generated by the plurality of provision-image generation cameras installed in the facility. The storage unit 11 may store the provision image data in association with an imaging date and time (date and time) and an imaging position (for example, an attraction in the facility, latitude and longitude, or the like).

It should be noted that, although not illustrated, the information processing apparatus 10 includes an image analysis unit which performs image analysis on image data. The image analysis unit detects a person by performing image analysis on a provision image data, and extracts a feature value from an image of an area including the detected person. The image analysis unit may detect a specific part of the person, for example, the face of the person, and extract the feature value from image data of the area including the detected face. It should be noted that, in this specification, an image (or image data) in which a person is detected by image analysis is referred to as an image (or image data) including a person, in some cases. The storage unit 11 may store the feature value extracted from each provision image data in association with the provision image data.

The obtainment unit 12 obtains reference image data (a reference image) generated by the reference-image generation camera.

The extraction unit 13 extracts provision image data including a person included in the reference image data, from the storage unit 11.

For example, the image analysis unit described above performs image analysis on the reference image data, detects a person included in the image, and extracts a feature value from an image of an area including the detected person. The extraction unit 13 collates the feature value extracted from the reference image data with the feature value extracted from the provision image data stored in the storage unit 11, and extracts provision image data associated with the feature value having a similarity equal to or higher than a predetermined value.

The display control unit 14 causes the display of the browsing operation terminal to display the provision image by using the provision image data extracted by the extraction unit 13.

Next, an example of a flow of a process of the information processing system of the present example embodiment will be described.

The plurality of provision-image generation cameras repeat imaging and generating provision image data. The generated provision image data is stored in the storage unit 11 in association with, for example, an imaging date and time and an imaging position.

The image analysis unit performs image analysis on the provision image data stored in the storage unit 11, detects a person included in the image, and extracts a feature value from an image of an area including the detected person. The storage unit 11 stores the extracted feature value in association with the extracted provision image data.

A visitor who wants to browse a photo imaged in the facility comes to an installation position of the browsing operation terminal at any date and time. The visitor performs an operation of imaging a face of the visitor, on the browsing operation terminal. According to the operation, the reference-image generation camera of the browsing operation terminal performs imaging and generates reference image data. The browsing operation terminal transmits the generated reference image data to the information processing apparatus 10. It should be noted that, the browsing operation terminal may detect that there is a person in front of the browsing operation terminal by using a human detecting sensor or the like. The reference-image generation camera may perform imaging in response to human detection and generate reference image data.

Figure 3:
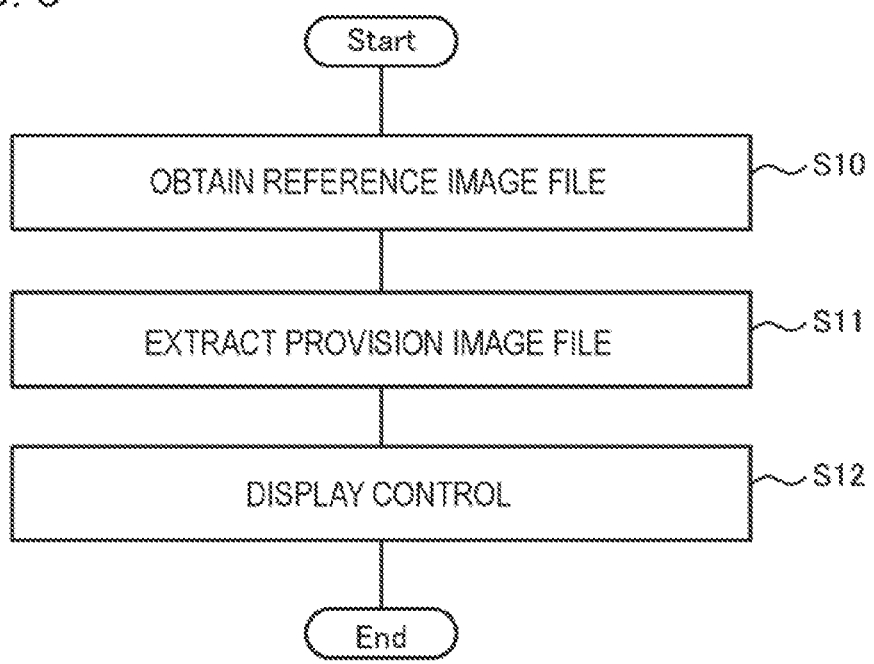
FIG. 3 is a flowchart illustrating an example of a flow of a process of the information processing apparatus according to the present example embodiment.

After then, the process of the information processing apparatus 10 illustrated in the flowchart of FIG. 3 is started.

The obtainment unit 12 obtains reference image data transmitted from the browsing operation terminal (S10). Then, the image analysis unit performs image analysis on the reference image data, detects a person included in the image, and extracts a feature value from an image of an area including the detected person. Then, the extraction unit 13 collates the extracted feature value with the feature value extracted from the provision image data, and extracts provision image data including the person included in the reference image data from the storage unit 11 (S11). The display control unit 14 transmits the provision image data extracted by the extraction unit 13 to the browsing operation terminal, and displays the provision image on the display (S12).

After displaying the provision image, the browsing operation terminal receives an operation for selecting one or a plurality of images among the displayed provision images as an object of purchase, an operation for receiving the provision image (for example, specification of printing out at the place, or transmitting electronic data to a predetermined e-mail address, or the like), a payment operation (for example, input of cash, card settlement, or the like), or the like. Next, modification examples will be described.

Modification Example 1

The browsing operation terminal receives an input of specifying an imaging location (for example, an attraction in the facility) or an imaging date and time (for example, 13:00 to 15:00 on Jun. 9, 2017) from a visitor. The browsing operation terminal transmits the information indicating the specification content to the information processing apparatus 10. The extraction unit 13 extracts provision image data, including a person included in the reference image data, imaged and generated at the specified imaging location or imaging date and time. For example, the extraction unit 13 performs the extraction by collating the feature value of the person included in the reference image data with the feature value of the person included in each provision image data stored in the storage unit 11 and by collating an imaging location or an imaging date and time specified by the visitor with an imaging location or an imaging date and time of each provision image data stored in the storage unit 11. Other configurations are as described above.

Modification Example 2

The image analysis unit extracts a character active in the facility by image analysis on the provision image data or a character included in the provision image data on the basis of a feature value of an appearance of the character installed in the facility. The feature value of the appearance of the character may be stored in advance in a storage apparatus accessible by the image analysis unit. The storage unit 11 can store information for identifying the extracted character in association with each provision image data.

The browsing operation terminal receives an input from a visitor which specifies a character active in the facility. The browsing operation terminal transmits information indicating the specification content to the information processing apparatus 10. The extraction unit 13 extracts provision image data including both of a person included in the reference image data and the specified character. For example, the extraction unit 13 performs the extraction by collating the feature value of the person included in the reference image data with the feature value of the person included in each provision image data stored in the storage unit 11 and by collating a character specified by the visitor with a character associated with each provision image data stored in the storage unit 11. Other configurations are as described above.

Modification Example 3

In a case where the extraction unit 13 extracts a plurality of pieces of provision image data, the display control unit 14 controls a display order on the display.

For example, the display control unit 14 may preferentially display provision image data in which "a person detected from reference image data is smiling". "Preferential display" means that in a case where a plurality of images are displayed side by side at the same time, the image is displayed at a top of a screen. In addition, in a case where a plurality of images are displayed on the display in order by a predetermined number (equal to or more than one), this means that the images are displayed earlier.

Further, the display control unit 14 may preferentially display provision image data satisfying "a face of a person detected from reference image data is larger than a predetermined level". Further, a priority may be assigned in descending order of the size of the face of the person detected from the reference image data.

Further, the display control unit 14 may preferentially display provision image data satisfying "including a person having a similarity with a person detected from reference image data equal to or higher than a predetermined value". In addition, a priority may be assigned in descending order of the similarity.

It should be noted that, the image analysis unit described above determinates the smile or determinates a size of the face of the person. Other configurations are as described above.

Modification Example 4

In a case where the number of pieces of provision image data extracted by the extraction unit 13 is equal to or larger than a threshold value, the display control unit 14 narrows the number of pieces of provision image data (provision image data transmitted to the browsing operation terminal) used for display down to below the threshold value. The information processing apparatus 10 transmits the provision image data that is narrowed down to the browsing operation terminal, and displays the provision image data on the display.

For example, the display control unit 14 groups provision image data imaged and generated at the same location (for example, the same attraction), provision image data imaged and generated at the same time period, or provision image data imaged and generated at the same time period at the same location (for example, the same attraction), and extracts (for example, randomly extracts) a predetermined number of pieces of provision image data from each group, and transmits the provision image data to the browsing operation terminal. For example, the display control unit 14 obtains a feature value of a person included in each provision image data stored in the storage unit 11 and an imaging location or an imaging date and time of each provision image data and performs the grouping by comparing the feature value and the imaging location or the imaging date and time.

For example, the display control unit 14 may preferentially extract provision image data satisfying "a person detected from reference image data is smiling", provision image data satisfying "a face of a person detected from reference image data is larger than a predetermined level", or provision image data satisfying "including a person having a similarity with a person detected from reference image data equal to or higher than a predetermined value" in the narrowing process described above.

It should be noted that, the image analysis unit described above determinates the smile or determinates a size of the face of the person. Other configurations are as described above.

Modification Example 5

The storage unit 11 deletes the stored provision image data every day, every predetermined number of days, or every predetermined time. For example, when business for the day ends at the facility, the storage unit 11 may delete all provision image data captured and generated on that day. Other configurations are as described above. In this manner, it is possible to reduce the risk that the private image data of the visitors leaks to the outside or is illegally used for other purposes. It should be noted that, the provision image data may be excluded from an object of the extraction process performed by the extraction unit 13 instead of deleting the provision image data. In this case, the image may not be browsed without separate authentication different from the face authentication described above.

Modification Example 6

The information processing system may include a living body detection (liveness detection) function. More specifically, the information processing system includes a unit which determines whether or not a person included in reference image data is actually positioned and imaged in front of the reference-image generation camera. This is for suppressing the act of causing the reference-image generation camera to image a photo including the face of another person to browse provision image data related to the other person.

For example, by providing a 3D sensor or the like in the browsing operation terminal and using a sensing result thereof, it can be determined whether or not a person included in reference image data is actually positioned and imaged in front of the reference-image generation camera. When the information processing system determines that the person included in the reference image data is actually positioned and imaged in front of the reference-image generation camera, the information processing system uses the reference image data to extract the provision image data and display the image. On the other hand, when the information processing system determines that the person included in the reference image data is not actually positioned and imaged in front of the reference-image generation camera, the information processing system does not extract the provision image data and the image is not displayed. The information processing system may use a living body detection technology other than the 3D sensor. Other configurations are as described above.

Modification Example 7

A visitor uses the visitor's own terminal apparatus (for example, a personal computer (PC), a smartphone, a tablet, or the like) for browsing an image captured in the facility (an image captured by a provision-image generation camera).

For example, a website for browsing images is prepared in advance for the facility. The visitor operates the terminal apparatus of the visitor to visit the website, and performs an operation of transmitting reference image data including a face of the visitor to the information processing apparatus 10 on the website. Other configurations can be realized by replacing the browsing operation terminal described above with the terminal apparatus of the visitor.

Modification Example 8

The information processing system has one or a plurality of display apparatuses installed at any positions in the facility. The display apparatus includes a display and a reference-image generation camera. The browsing operation terminal is a terminal intended to perform browsing, purchasing, and the like of images by visitors. On the other hand, the display apparatus is a terminal mainly intended to provide entertainment for visitors.

Figure 4:
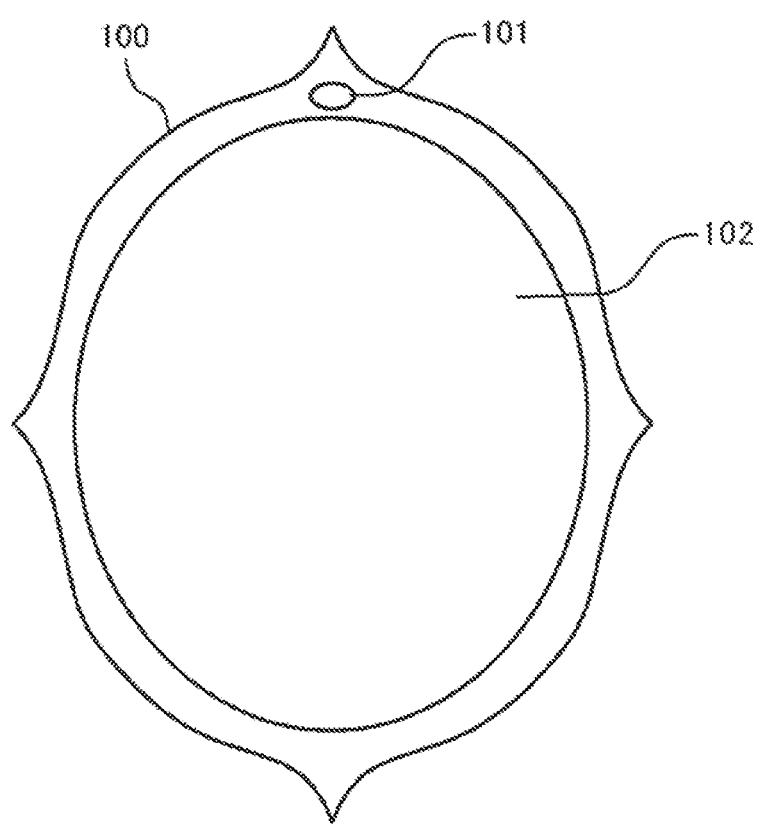
FIG. 4 is a diagram schematically illustrating an example of an appearance of a display apparatus of the present example embodiment.

FIG. 4 illustrates an example of a display apparatus 100. An appearance of the display apparatus 100 is, for example, a mirror. The display apparatus 100 includes a reference-image generation camera 101 and a display 102. The reference-image generation camera 101 images a front area of the display apparatus 100.

For example, a visitor is positioned in front of the display apparatus 100 during a waiting time, a gap time, or the like for an attraction. The reference-image generation camera 101 of the display apparatus 100 captures the visitor, generates reference image data, and transmits the reference image data to the information processing apparatus 10. The information processing apparatus 10 performs the extraction process of provision image data described in the first example embodiment in response to obtainment of the reference image data. The information processing apparatus 10 transmits the extracted provision image data to the display apparatus 100, and displays the image on the display 102.

For example, the display apparatus 100 may display in real time an image captured by the reference-image generation camera 101 on the display 102 while no person is positioned in front (while a predetermined condition is not satisfied). Then, when a predetermined time elapses after a person goes into position in front (when the predetermined condition is satisfied), the provision image may be displayed on the display 102 by using the provision image data transmitted from the information processing apparatus 10.

Further, the display control unit 14 may cause the display apparatus 100 to function as a mirror while no person is positioned in front of the display apparatus 100 (while the predetermined condition is not satisfied). Then, when a predetermined time elapses after a person goes into position in front (when the predetermined condition is satisfied), the provision image may be displayed on the display 102 by using the provision image data transmitted from the information processing apparatus 10. The display can be realized, for example, by using a so-called mirror display which dynamically adjusts a reflectance factor with respect to external light on a layer provided on the display.

In this case, the display apparatus 100 functions as a mirror or a mirror which reflects the front area while the predetermined condition is not satisfied, and when a predetermined condition is satisfied, the display apparatus 100 functions as a magical mirror which reflects memories of the day of the person reflected in the mirror at that time (images captured in the facility by that time). For example, the predetermined condition may be that a person is positioned in front of the display apparatus 100 for over a predetermined time. It should be noted that, whether or not a person is positioned in front may be determined by image analysis, or a human detecting sensor or the like may be used.

The information processing system according to the present example embodiment can employ the one or the plurality of modifications described above.

According to the information processing system of the present example embodiment described above, image data (image data determined to include each visitor by image analysis) suitable for each visitor from among enormous images data generated by the plurality of cameras installed in the facility can be extracted and presented.

A visitor does not need to perform a troublesome task of searching for an image including the visitor from enormous images. In addition, since a large number of scenes are imaged by a plurality of cameras, there is a high possibility that a preferred image of the visitor (for example, an image with a smile, a largely captured image, or the like) can be found. As a result, it is possible to improve service satisfaction.

In addition, in a case of the present example embodiment, the visitor need not register a face in advance. For this reason, convenience is improved.

In addition, as described in Modification Example 1 and Modification Example 2, the visitor can specify a search condition (an imaging location, a time, a character, or the like) and browse an image satisfying the search condition. By setting the search condition appropriately, the visitor can efficiently find preferred images of the visitor.

In addition, as described in Modification 3 and Modification 4, in a case where there are a large number of pieces of provision image data including a certain visitor, an image considered to be preferred by the visitor can be preferentially displayed or preferentially extracted as an object of display to narrow the number of images. As a result, the visitor can efficiently find preferred images of the visitor.

In addition, as described in Modification Example 5, by deleting provision image data daily or remove the provision image data from the object of search instead of accumulating the provision image data, it is possible to reduce the risk that the private image data of the visitors leaks to the outside or is illegally used for other purposes.

Further, as described in Modification Example 6, the information processing system determines whether or not a person included in reference image data is actually positioned and imaged in front of a reference-image generation camera and switches whether or not extract the provision image data and display the image according to the determination result. As a result, it is possible to suppress the inconvenience act or the like of causing the reference-image generation camera to image a photo of a public figure and browsing provision image data related to the person.

In addition, as described in Modification Example 7, in the information processing system, an own terminal apparatus of a visitor can be used instead of the browsing operation terminal. As a result, the visitor can avoid waiting for the browsing operation terminal. Further, after returning home from the facility, the visitor can browse images slowly at home.

In addition, as described in Modification Example 8, the information processing system can be used as an entertainment facility used for waiting time, a gap time, or the like for an attraction. Such a service improves satisfaction of visitors.

Second Example Embodiment

As the number of visitors to the facility increases, accuracy of extracting provision image data including a person included in reference image data decreases. As a result, there is a high possibility that the image provided by the browsing operation terminal includes an image not including a person operating the browsing operation terminal (an image including a person similar to the person). The information processing system according to the present example embodiment includes a unit which improves extraction accuracy. This will be described below.

In the same manner as the first example embodiment, the information processing system includes the plurality of provision-image generation cameras, the storage unit, the one or the plurality of browsing operation terminals, and the information processing apparatus. A configuration of the provision-image generation camera, the storage unit, and the browsing operation terminal is the same as that of the first example embodiment. In addition, the information processing system may adopt the modification described in the first example embodiment.

Hereinafter, a configuration of the information processing apparatus 10 will be described. The information processing apparatus 10 has the same hardware configuration as the first example embodiment.

FIG. 2 illustrates the example of the functional block diagram of the information processing apparatus 10. As illustrated, the information processing apparatus 10 includes the storage unit 11, the obtainment unit 12, the extraction unit 13, and the display control unit 14. It should be noted that, the information processing apparatus 10 may not include the storage unit 11. In this case, an external apparatus includes the storage unit 11 and is configured to be accessible from the information processing apparatus 10 to the storage unit 11. A configuration of the storage unit 11, the obtainment unit 12, and the display control unit 14 is the same as that in the first example embodiment.

In a case where a plurality of persons are included in reference image data, the extraction unit 13 extracts provision image data including at least two persons (for example, all of the plurality of persons) among the plurality of persons.

It should be noted that, in a case where the reference image data includes the plurality of persons each with a predetermined size or larger (for example, a face is equal to or larger than the predetermined size), the extraction unit 13 may extract provision image data including at least two (for example, all of the plurality of persons) among the plurality of persons included in the reference image data with the predetermined size or larger.

For example, in a case a group such as a family, a couple, or a group of friends visits, the facility side guides a plurality of persons who come together at the same time in front of the browsing operation terminal and asks the persons to take a picture. The reference-image generation camera images the plurality of persons at the same time, and generates reference image data including the plurality of persons.

Even though sufficient extraction accuracy is not obtained in a case of using one person as a key and extracting provision image data determined to include the person, it is possible to improve extraction accuracy by using a plurality of persons as a key and extracting provision image data determined to include the persons. According to the present example embodiment, as described above, it is possible to reduce inconvenience that an image provided by the browsing operation terminal includes an image not including a person operating the browsing operation terminal (an image including a person similar to the person).

In addition, by narrowing down persons used as keys to persons having predetermined sizes or larger (for example, a face is equal to or larger than the predetermined size) included in the reference image data, even in a case where a person of another group in the periphery of the browsing operation terminal happens to be included in the image, the extraction process can be performed by excluding the person.

Further, the extraction unit 13 determines persons belonging to the same group on the basis of a distance (a distance between a face and a face) between a plurality of persons included in the reference image data, and provision image data including at least two persons (for example, all of the plurality of persons) among the plurality of persons included in the same group may be extracted. In this case, in a case where the distance is equal to or less than a reference value, the person is determined to be in the same group. For example, the extraction unit 13 may determine a representative among a plurality of persons included in the reference image data, and may determine that persons having distances from the representative equal to or less than the reference value are in the same group. Then, provision image data including at least two persons (for example, all of the plurality of persons) among the plurality of persons included in the group may be extracted. The representative may be, for example, a person located at a front position, or a person having the largest face in the reference image data. The distance may be a two-dimensional distance in the reference image data.

It should be noted that, according to the present example embodiment, in addition to the above, the same advantageous effect as the first example embodiment can be realized.

Third Example Embodiment

The present example embodiment includes another unit which improves extraction accuracy. This will be described below.

In the same manner as the first and second example embodiments, the information processing system includes the plurality of provision-image generation cameras, the storage unit, the one or the plurality of browsing operation terminals, and the information processing apparatus. A configuration of the provision-image generation camera, the storage unit, and the browsing operation terminal is the same as those of the first and second example embodiments, except as described below. In addition, the information processing system may adopt the modification described in the first example embodiment.

Hereinafter, a configuration of the information processing apparatus 10 will be described. The information processing apparatus 10 has the same hardware configuration as the first and second example embodiments.

FIG. 2 illustrates the example of the functional block diagram of the information processing apparatus 10. As illustrated, the information processing apparatus 10 includes the storage unit 11, the obtainment unit 12, the extraction unit 13, and the display control unit 14. It should be noted that, the information processing apparatus 10 may not include the storage unit 11. In this case, an external apparatus includes the storage unit 11 and is configured to be accessible from the information processing apparatus 10 to the storage unit 11. A configuration of the storage unit 11, the obtainment unit 12, and the display control unit 14 is the same as those in the first and second example embodiments.

The extraction unit 13 obtains position information of a specific person included in reference image data in the facility and time information corresponding to the position information (hereinafter, collectively referred to as "first information", in sometimes).

The first information is information indicating where the person included in the reference image data was in the facility at each date and time. The first information may be a set of pairs of date and time and a position where each person was at each date and time, or may be flow information.

For example, the extraction unit 13 may obtain an imaging date and time and an imaging position of provision image data including a person having a similarity equal to or higher than a predetermined level with a person included in reference image data, as first information of the person. It is preferable to set a sufficiently high threshold value for the predetermined level of similarity. In this manner, it is possible to generate the first information of the person included in the reference image data on the basis of the provision image data sufficiently likely to include the person (the person himself or herself).

Further, an electronic tag or a portable terminal which stores identification information may be provided to a visitor, and a wireless communication apparatuses (readers) may be installed at a plurality of locations in the facility to wirelessly communicate with the electronic tag or the portable terminal and obtains the identification information. Then, the first information for each piece of identification information may be generated on the basis of a position and a date and time at which each wireless communication apparatus collects the identification information. In addition, the browsing operation terminal may include a wireless communication apparatus which wirelessly communicates with the electronic tag or the portable terminal. The wireless communication apparatus may obtain identification information from an electronic tag or a portable terminal held by a person (person included in reference image data) in the periphery of the browsing operation terminal (a location where a person operating the browsing operation terminal exists) and may transmit the identification information to the information processing apparatus 10. On the basis of the information, the extraction unit 13 may obtain the first information of the person included in the reference image data.

The extraction unit 13 excludes provision image data of which the imaging date and time and the imaging position do not satisfy a predetermined condition in relation to the first information, from an object to be extracted as an image which includes the person included in the reference image data.

For example, in a case where the first information indicates that the person was present at an attraction A at 11:00, the extraction unit 13 excludes provision image data imaged and generated at 11:00 at another location, from an object to be extracted.

In addition, the extraction unit 13 may hold information indicating a normal arrival time (a moving time) between a plurality of attractions in advance. By using the information, provision image data to be excluded from an object to be extracted may be determined. For example, in a case where the first information determines that the person was present at the attraction A at 11:00 and the normal arrival time from the attraction A to an attraction B is 5 minutes, provision image data captured and generated at the attraction B from at 10:55 and to at 11:05 is excluded from an object to be extracted.

Further, based on an imaging location and an imaging date and time of provision image data including a person having a similarity with a person included in reference image data equal to or larger than a reference value, the extraction unit 13 may exclude provision image data generated at a location and an imaging date and time at which the person at the imaging location at the imaging date and time cannot reach within the normal arrival time, from an object to be extracted.

According to the present example embodiment, the same advantageous effect as the first example embodiment can be realized. In addition, according to the present example embodiment, it is possible to improve accuracy of extracting provision image data including a person included in reference image data.

It should be noted that, the electronic tag may be passed to the visitor on the location. Further, the electronic tag may be embedded in an annual pass or the like. In addition, the portable terminal may be a smartphone, a tablet, or the like installed with a predetermined application.

Fourth Example Embodiment

The present example embodiment includes still another unit which improves extraction accuracy. This will be described below.

In the same manner as the first to third example embodiments, the information processing system includes the plurality of provision-image generation cameras, the storage unit, the one or the plurality of browsing operation terminals, and the information processing apparatus. A configuration of the provision-image generation camera, the storage unit, and the browsing operation terminal is the same as those of the first to third example embodiments, except as described below. In addition, the information processing system may adopt the modification described in the first example embodiment.

Hereinafter, a configuration of the information processing apparatus 10 will be described. The information processing apparatus 10 has the same hardware configuration as the first to third example embodiments.

FIG. 2 illustrates the example of the functional block diagram of the information processing apparatus 10. As illustrated, the information processing apparatus 10 includes the storage unit 11, the obtainment unit 12, the extraction unit 13, and the display control unit 14. It should be noted that, the information processing apparatus 10 may not include the storage unit 11. In this case, an external apparatus includes the storage unit 11 and is configured to be accessible from the information processing apparatus 10 to the storage unit 11. A configuration of the storage unit 11, the obtainment unit 12, and the display control unit 14 is the same as those in the first to third example embodiments.

In the present example embodiment, an electronic tag or a portable terminal which stores identification information is provided to a visitor. A wireless communication apparatus (a reader) which wirelessly communicates with the electronic tag or the portable terminal and obtains the identification information is installed in a periphery (a location at which wireless communication can be performed with the electronic tag or the portable terminal held by the person imaged by the provision-image generation camera) of each of the plurality of provision-image generation cameras and in a periphery (a location at which wireless communication can be performed with the electronic tag or the portable terminal held by the person operating the browsing operation terminal) of each of the one or the plurality of browsing operation terminals. It should be noted that, as described in the third example embodiment, in order to obtain the first information, the wireless communication apparatuses may be scattered in the facility.

The wireless communication apparatus (a first wireless communication apparatus) installed in the periphery of the provision-image generation camera wirelessly communicates with one or a plurality of electronic tags or portable terminals of which a positional relationship satisfies a predetermined condition (a positional relationship capable of performing communication with each other) at a date and time imaged by the provision-image generation camera or a date and time close to the date and time and obtains identification information stored in the electronic tag or the portable terminal.

It should be noted that, the first wireless communication apparatus is preferably installed so as to be able to communicate with the electronic tag or the portable terminal held by a visitor positioned in an area imaged by the provision-image generation camera.

For example, when the provision-image generation camera performs imaging, information indicating the imaging may be input to the first wireless communication apparatus. The first wireless communication apparatus wirelessly communicates with the one or the plurality of electronic tags or portable terminals of which a positional relationship satisfies a predetermined condition (a positional relationship capable of performing communication with each other) with imaging as a trigger, and obtains the identification information stored in the electronic tag or the portable terminal.

It should be noted that, when the first wireless communication apparatus wirelessly communicates with the one or the plurality of electronic tags or portable terminals of which the positional relationship satisfies the predetermined condition (the positional relationship capable of performing communication with each other) and obtains the identification information stored in the electronic tag or the portable terminal, the first wireless communication apparatus may transmit information indicating that to the provision-image generation camera. The provision-image generation camera may perform imaging by using the receipt of the information indicating obtainment of the identification information as a trigger.

Further, the first wireless communication apparatus may wirelessly and continuously communicate every predetermined time with the one or the plurality of electronic tags or portable terminals of which a positional relationship satisfies a predetermined condition (a positional relationship capable of performing communication with each other), and may store each identification information obtained from the electronic tag or the portable terminal in association with the obtained date and time. Then, the provision image data and the identification information having the same or close (for example, closest or within a predetermined time) imaging date and time and the same or close identification information obtainment date and time may be associated with each other.

The storage unit 11 stores each of the plurality of pieces of provision image data in association with one or a plurality of pieces of identification information obtained by the first wireless communication apparatus at a date and time (an imaging date and time) when each provision image data is generated or at a date and time close to the date and time.

FIG. 5 is a diagram schematically illustrating an example of information stored in the storage unit 11. A provision image data ID (an identifier), one or a plurality of facial feature values (feature values extracted from an image of an area including the detected person) extracted from each provision image data, the one or the plurality of pieces of identification information obtained by the first wireless communication apparatus at a date and time (an imaging date and time) when each provision image data is generated or a date and time close to the date and time are associated with one another. Further, although not illustrated, an imaging date and time, an imaging position, information such as a character or the like included in the image may be associated with one another.

A second wireless communication apparatus installed in a periphery of the reference-image generation camera wirelessly communicates with the one or the plurality of electronic tags or portable terminals of which a positional relationship satisfies a predetermined condition (a positional relationship capable of performing communication with each other) at a date and time at which the reference-image generation camera images a visitor or a date and time close to the date and time and obtains identification information stored in the electronic tag or the portable terminal.

It should be noted that, the second wireless communication apparatus is preferably installed so as to be able to communicate with the electronic tag or the portable terminal held by a visitor operating the browsing operation terminal.

For example, when the reference-image generation camera performs imaging, information indicating the imaging may be input to the second wireless communication apparatus. The second wireless communication apparatus wirelessly communicates with the one or the plurality of electronic tags or portable terminals of which a positional relationship satisfies a predetermined condition (a positional relationship capable of performing communication with each other) with imaging as a trigger, and obtains the identification information stored in the electronic tag or the portable terminal.

It should be noted that, when the second wireless communication apparatus wirelessly communicates with the one or the plurality of electronic tags or portable terminals of which the positional relationship satisfies the predetermined condition (the positional relationship capable of performing communication with each other) and obtains the identification information stored in the electronic tag or the portable terminal, the first wireless communication apparatus may transmit information indicating that to the reference-image generation camera. The reference-image generation camera may perform imaging by using the receiving of the information indicating obtainment of the identification information as a trigger.

Further, the second wireless communication apparatus may wirelessly and continuously communicate every predetermined time with the one or the plurality of electronic tags or portable terminals of which a positional relationship satisfies a predetermined condition (a positional relationship capable of performing communication with each other) at each date and time, and may store identification information obtained from the electronic tag or the portable terminal in association with each date and time. The reference image data and the identification information having the close (for example, closest) imaging date and time, and the close identification information obtainment date and time may be associated with each other.

The browsing operation terminal transmits reference image data and one or a plurality of pieces of identification information obtained by the second wireless communication apparatus at a date and time (an imaging date and time) when the reference image data is generated or a date and time close to the date and time to the information processing apparatus 10 in association with each other.

The obtainment unit 12 obtains the reference image data and the one or the plurality of pieces of identification information obtained by the second wireless communication apparatus at a date and time (an imaging date and time) when the reference image data is generated or a date and time close to the date and time.

The extraction unit 13 extracts provision image data which includes a person included in the reference image data and which is associated with the identification information (identification information obtained by the second wireless communication apparatus) obtained by the obtainment unit 12. For example, the extraction unit 13 performs the extraction by collating a feature value of the person included in the reference image data with a feature value of the person included in each provision image data stored in the storage unit 11 and by collating identification information obtained by the obtainment unit 12 with identification information associated with each provision image data stored in the storage unit 11.

It should be noted that, the extraction unit 13 may extract provision image data associated with the identification information obtained by the obtainment unit 12 and extract provision image data including the person included in the reference image data from the provision image data. A load of the extraction process using the identification information as a key is smaller than that of the extraction process using the feature value as a key, with respect to a computer. With the configuration in which the search is performed by using the feature value after performing the narrowing according to the identification information, it is possible to reduce the number of pieces of provision image data which is an object of search using the feature value. For this reason, it is possible to reduce the processing load of the computer by performing the search using the feature value after performing the narrowing according to the identification information, as compared with the case of performing the search using the identification information after performing the narrowing according to the feature value.

In addition, in a case where M persons (M is equal to or more than one) are included in reference image data and N (N is equal to or more than one) pieces of identification information are obtained by the obtainment unit 12, the extraction unit 13 extracts provision image data including at least one of M persons and being associated with at least one of the N pieces of identification information.

It should be noted that, in a case where the reference image data includes the plurality of persons each with a predetermined size or larger (for example, a face is equal to or larger than the predetermined size) and the obtainment unit 12 obtains N (N is equal to or more than one) pieces of identification information, the extraction unit 13 may extract provision image data including all of the plurality of persons included, having the predetermined size or larger, in the reference image data and associated with at least one of the N pieces of identification information.

According to the present example embodiment, the same advantageous effect as the first example embodiment can be realized. In addition, according to the present example embodiment, it is possible to extract provision image data including a person included in reference image data by using a key obtained by combining the facial feature value and the identification information (tag information) obtained in the vicinity of the imaging position. For this reason, it is possible to improve detection accuracy.

It should be noted that, the electronic tag may be passed to the visitor on the location. Further, the electronic tag may be embedded in an annual pass or the like. In addition, the portable terminal may be a smartphone, a tablet, or the like installed with a predetermined application.

Fifth Example Embodiment

The information processing apparatus 10 according to the present example embodiment executes the same extraction process as those of the first to fourth example embodiments. The information processing system of the present example embodiment is different from the first to fourth example embodiments in that the information processing system is not limited to be used for an amusement facility where a large number of people are gathered, such as a theme park, a passenger ship, and the like.

The information processing apparatus 10 of the present example embodiment has the same hardware configuration as the first to fourth example embodiments.

Figure 7:
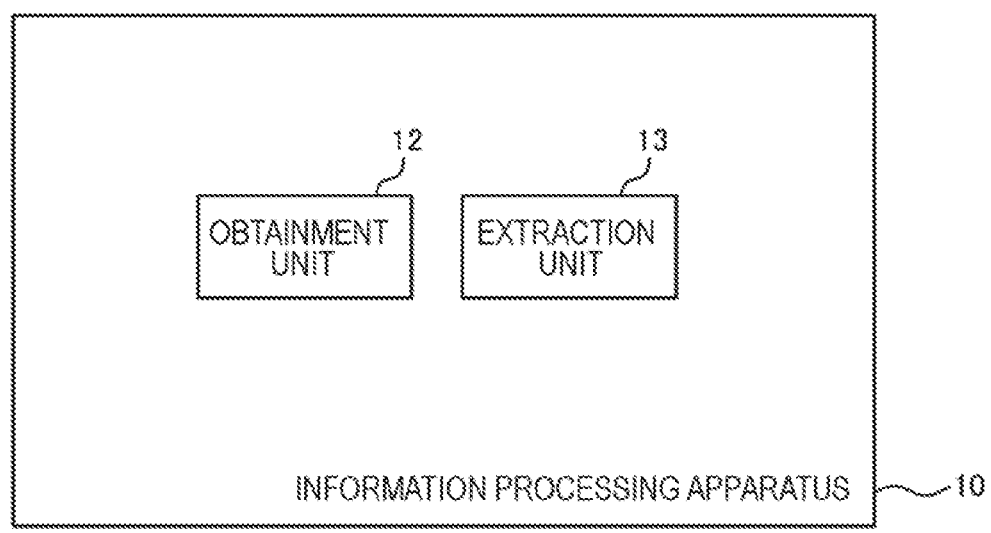
FIG. 7 is an example of still another functional block diagram of the information processing apparatus according to the present example embodiment.

FIG. 7 is an example of another functional block diagram of the information processing apparatus 10 according to the present example embodiment. As illustrated, the information processing apparatus 10 includes the obtainment unit 12 and the extraction unit 13. It should be noted that, although not illustrated, the information processing apparatus 10 may further include the storage unit 11. In a case where the storage unit 11 is not included, an external apparatus includes the storage unit 11 and is configured to be accessible from the information processing apparatus 10 to the storage unit 11. In addition, the information processing apparatus 10 may include the display control unit 14.

The obtainment unit 12 obtains first image data (a first image) generated by a first camera in association with one or a plurality of pieces of identification information. The one or the plurality of pieces of identification information is information obtained by a wireless communication apparatus which is installed in the periphery (a location at which wireless communication can be performed with the electronic tag or the portable terminal held by a person imaged by the first camera) of the first camera, wirelessly communicates with one or a plurality of electronic tags or portable terminals of which a positional relationship satisfies a predetermined condition, and obtains identification information from the one or the plurality of electronic tags or portable terminals.

The storage unit 11 stores second image data (a second image) generated by a plurality of second cameras in association with the one or the plurality of pieces of identification information. The one or the plurality of pieces of identification information is information obtained by a wireless communication apparatus which is installed in the periphery (a location at which wireless communication can be performed with the electronic tag or the portable terminal held by a person imaged by the second camera) of each of the plurality of second cameras, wirelessly communicates with one or a plurality of electronic tags or portable terminals of which a positional relationship satisfies a predetermined condition, and obtains identification information from the one or the plurality of electronic tags or portable terminals.

The extraction unit 13 includes the person included in the first image data and extracts the second image data associated with the identification information obtained by the obtainment unit 12, from the storage unit 11.

In addition, in a case where M persons (M is equal to or more than one) are included in the first image data and N (N is equal to or more than one) pieces of identification information are obtained by the obtainment unit 12, the extraction unit 13 may extract the second image data including at least one of M persons and being associated with at least one of the N pieces of identification information.

It should be noted that, in a case where the first image data includes the plurality of persons with a predetermined size or larger (for example, a face is equal to or larger than the predetermined size) and the obtainment unit 12 obtains N (N is equal to or more than one) pieces of identification information, the extraction unit 13 may extract the second image data including all of the plurality of persons with the predetermined size or larger and associated with at least one of the N pieces of identification information.

It should be noted that, after performing a search process using the identification information associated with the first image data as a key, the extraction unit 13 may perform a search process using a feature value of the first image data as a key. A load of the extraction process using the identification information as a key is smaller than that of the extraction process using the feature value as a key, with respect to a computer. With the configuration in which the search is performed by using the feature value after performing the narrowing according to the identification information, it is possible to reduce the number of pieces of second image data which is an object of search using the feature value. For this reason, it is possible to reduce the processing load of the computer by performing the search using the feature value after performing the narrowing according to the identification information, as compared with the case of performing the search using the identification information after performing the narrowing according to the feature value.

Other configurations of the storage unit 11, the obtainment unit 12, the extraction unit 13, and the display control unit 14 can be the same as those in the first to fourth example embodiments.

Figure 8:
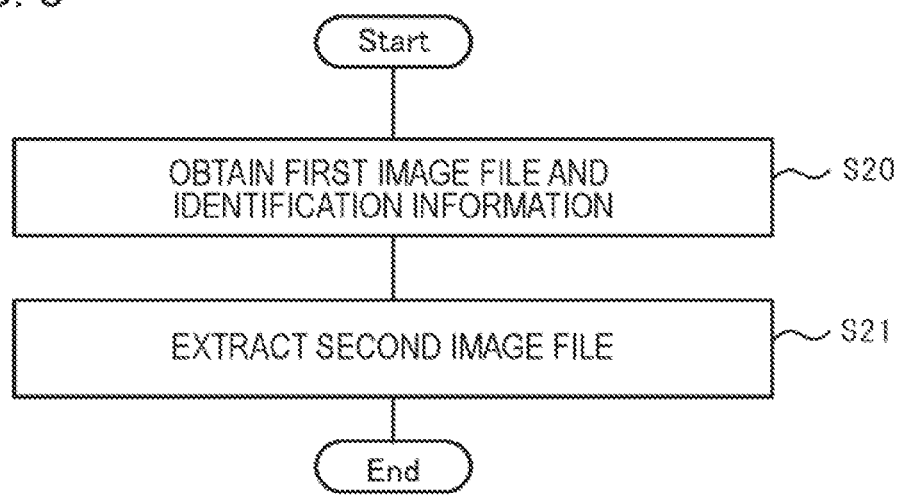
FIG. 8 is a flowchart illustrating an example of a flow of another process of the information processing apparatus according to the present example embodiment.

Next, an example of a flow of the process of the information processing apparatus 10 according to the present example embodiment will be described with reference to the flowchart in FIG. 8.

In S20, the obtainment unit 12 obtains the first image generated by the first camera in association with one or a plurality of pieces of identification information obtained by a wireless communication apparatus which is installed in the periphery of the first camera and obtains identification information from the one or the plurality of electronic tags or portable terminals of which a positional relationship satisfies a predetermined condition.

In S21, the extraction unit 13 extracts a predetermined second image from the storage unit 11. The storage unit 11 stores the second image generated by the plurality of second cameras in association with the one or the plurality of pieces of identification information obtained by a wireless communication apparatus which is installed in the periphery of each of the plurality of second cameras and obtains identification information from the one or the plurality of electronic tags or portable terminals of which a positional relationship satisfies a predetermined condition. The extraction unit 13 includes the person included in the first image and extracts the second image associated with the identification information obtained by the obtainment unit 12, from the storage unit 11.

According to the present example embodiment, it is possible to extract the second image data including a person included in the first image data with high accuracy.

Hereinafter, appendixes to examples of reference forms will be added.

1. An information processing apparatus including:
   an obtainment unit which obtains a reference image;
   an extraction unit which extracts, from a storage unit which stores ae provision image generated by a plurality of provision-image generation cameras installed in a facility, the provision image including a person included in the reference image; and
   a display control unit which causes a display to display the provision image extracted by the extraction unit.

2. The information processing apparatus according to 1,
   in which in a case where a plurality of persons are included in the reference image, the extraction unit extracts the provision image including at least two persons among the plurality of persons.

3. The information processing apparatus according to 2,
   in which in a case where the reference image includes a plurality of persons each with a predetermined size or larger, the extraction unit extracts the provision image including at least two among the plurality of persons included in the reference image with the predetermined size or larger.

4. The image processing apparatus according to any one of 1 to 3,
   in which the obtainment unit obtains an image generated by a reference-image generation camera which images a periphery of the display, as the reference image.

5. The information processing apparatus according to 4,
   in which the display control unit
   causes the display to display an image captured by the reference-image generation camera or causes a display apparatus including the display to function as a mirror while a predetermined condition is not satisfied, and
   causes the display to display the provision image extracted by the extraction unit when the predetermined condition is satisfied.

6. The image processing apparatus according to any one of 1 to 5,
   in which the storage unit stores the provision image in association with an imaging date and time and an imaging position, and
   the extraction unit
   obtains position information of a specific person included in the provision image in the facility and time information corresponding to the position information, and
   excludes the provision image from an object to be extracted as an image including the specific person in a case where an imaging date and time and an imaging position do not satisfy a predetermined condition in relation to the position information and the time information.

7. The information processing apparatus according to 6,
   in which the extraction unit obtains an imaging date and time and an imaging position of the provision image including a person having a similarity with the specific person included in the reference image equal to or higher than a predetermined level, as the position information and the time information for the specific person.

8. The information processing apparatus according to any one of 1 to 7,
   in which the storage unit stores one or a plurality of pieces of identification information obtained by a wireless communication apparatus which is installed in a periphery of each of the plurality of provision-image generation cameras and obtains the identification information from one or a plurality of electronic tags or portable terminals of which a positional relationship satisfies a predetermined condition, in association with the provision image generated within a predetermined time from a date and time when the identification information is obtained,
   the obtainment unit
   obtains an image generated by a reference-image generation camera which images a periphery of the display, as the reference image, and
   obtains the one or the plurality of pieces of identification information obtained by a wireless communication apparatus which is installed in a periphery of the reference-image generation camera and obtains the identification information from the one or the plurality of electronic tags or portable terminals of which a positional relationship satisfies a predetermined condition, and
   the extraction unit extracts the provision image including a person included in the reference image and being associated with the identification information obtained by the obtainment unit.

9. The information processing apparatus according to 8,
   in which in a case where M persons (M is equal to or more than one) are included in the reference image and N (N is equal to or more than one) pieces of the identification information are obtained by the obtainment unit, the extraction unit extracts the provision image including at least one person among the M persons and being associated with at least one of the N pieces of the identification information.

10. The information processing apparatus according to 9,
    in which in a case where a plurality of persons having predetermined sizes or larger are included in the reference image and N (N is equal to or more than one) pieces of the identification information are obtained by the obtainment unit, the extraction unit extracts the provision image including all of the plurality of persons having the predetermined sizes or larger included in the reference image and being associated with at least one of the N pieces of the identification information.

11. An information processing apparatus including:
    an obtainment unit which obtains a first image generated by a first camera in association with one or a plurality of pieces of identification information obtained by a wireless communication apparatus which is installed in a periphery of the first camera and obtains the identification information from one or a plurality of electronic tags or portable terminals of which a positional relationship satisfies a predetermined condition; and
    an extraction unit which extracts a second image, generated by a plurality of second cameras, including a person included in the first image and being associated with the identification information obtained by the obtainment unit, from a storage unit which stores the second image in association with the one or the plurality of pieces of identification information obtained by a wireless communication apparatus which is installed in a periphery of each of the plurality of second cameras and obtains the identification information from the one or the plurality of electronic tags or portable terminals of which a positional relationship satisfies a predetermined condition.

12. The information processing apparatus according to 11, in which in a case where M persons (M is equal to or more than one) are included in the first image and N (N is equal to or more than one) pieces of the identification information are obtained by the obtainment unit, the extraction unit extracts the second image including at least one person among the M persons and being associated with at least one of the N pieces of the identification information.

13. The information processing apparatus according to 12, in which in a case where a plurality of persons having predetermined sizes or larger are included the first image and N (N is equal to or more than one) pieces of the identification information are obtained by the obtainment unit, the extraction unit extracts the second image including all of the plurality of persons having the predetermined sizes or larger included in the first image and being associated with at least one of the N pieces of the identification information.

14. An information processing method executed by a computer, the method including:
    an obtainment step of obtaining a reference image;
    an extraction step of extracting, from a storage unit which stores a provision image generated by a plurality of provision-image generation cameras installed in a facility, the provision image including a person included in the reference image; and
    a display control step of causing a display to display the provision image extracted in the extraction step.

15. A program causing a computer to function as:
    an obtainment unit which obtains a reference image;
    an extraction unit which extracts, from a storage unit which stores a provision image generated by a plurality of provision-image generation cameras installed in a facility, the provision image including a person included in the reference image; and
    a display control unit which causes a display to display the provision image extracted by the extraction unit.

16. An information processing method executed by a computer, the method including:
    an obtainment step of obtaining a first image generated by a first camera in association with one or a plurality of pieces of identification information obtained by a wireless communication apparatus which is installed in a periphery of the first camera and obtains the identification information from one or a plurality of electronic tags or portable terminals of which a positional relationship satisfies a predetermined condition; and
    an extraction step of extracting a second image, generated by a plurality of second cameras, including a person included in the first image and being associated with the identification information obtained in the obtainment step, from a storage unit which stores the second image in association with the one or the plurality of pieces of identification information obtained by a wireless communication apparatus which is installed in a periphery of each of the plurality of second cameras and obtains the identification information from the one or the plurality of electronic tags or portable terminals of which a positional relationship satisfies a predetermined condition.

17. A program causing a computer to function as:
    an obtainment unit which obtains a first image generated by a first camera in association with one or a plurality of pieces of identification information obtained by a wireless communication apparatus which is installed in a periphery of the first camera and obtains the identification information from one or a plurality of electronic tags or portable terminals of which a positional relationship satisfies a predetermined condition; and
    an extraction unit which extracts a second image, generated by a plurality of second cameras, including a person included in the first image and being associated with the identification information obtained by the obtainment unit, from a storage unit which stores the second image in association with the one or the plurality of pieces of identification information obtained by a wireless communication apparatus which is installed in a periphery of each of the plurality of second cameras and obtains the identification information from the one or the plurality of electronic tags or portable terminals of which a positional relationship satisfies a predetermined condition.

This application claims priority on the basis of Japanese Patent Application No. 2017-122500 filed on Jun. 22, 2017, the disclosure of which is incorporated herein in its entirety.

The invention claimed is:

1. An information processing apparatus comprising:
    at least one memory configured to store one or more instructions; and
    at least one processor configured to execute the one or more instructions to:
        obtain a first image captured by a first camera, the first image including a plurality of faces of a plurality of persons;
        extract, from a plurality of second images captured by one or more second cameras installed in a facility, a second image including at least two persons of the plurality of persons in the first image; and
        cause a display to display the second image including the at least two persons of the plurality of persons in the first images.

2. The information processing apparatus according to claim 1:
    wherein the at least one processor further configured to execute the one or more instructions to:
    store the plurality of the second images in a storage.

3. The information processing apparatus according to claim 1,
    wherein the at least one processor is further configured to execute the one or more instructions to, in a case where the first image includes the plurality of faces each with a predetermined size or larger, display the second image including the at least two persons included in the first image with the predetermined size or larger.

4. The information processing apparatus according to claim 1,
    wherein the at least one processor is further configured to execute the one or more instructions to obtain an image generated by the first camera which images a periphery of the display, as the first image.

5. The information processing apparatus according to claim 4,
    wherein the at least one processor is further configured to execute the one or more instructions to:

cause the display to display an image captured by the first camera or cause a display apparatus including the display to function as a mirror while a predetermined condition is not satisfied, and cause the display to display the extracted second image when the predetermined condition is satisfied.

6. The information processing apparatus according to claim 1, wherein the at least one processor is further configured to execute the one or more instructions to:

store the second image in association with an imaging date and time and an imaging position, obtain position information of a specific person included in the second image in the facility and time information corresponding to the position information, and exclude the second image from an object to be displayed as an image including the specific person in a case where an imaging date and time and an imaging position do not satisfy a predetermined condition in relation to the position information and the time information.

7. The information processing apparatus according to claim 6, wherein the at least one processor is further configured to execute the one or more instructions to obtain an imaging date and time and an imaging position of the second image including a person having a similarity with the specific person included in the first image equal to or higher than a predetermined level, as the position information and the time information for the specific person.

8. The information processing apparatus according to claim 1, wherein the at least one processor is further configured to execute the one or more instructions to:

store one or a plurality of pieces of identification information obtained by a wireless communication apparatus which is installed in a periphery of each of the one or more second cameras and obtain the identification information from one or a plurality of electronic tags or portable terminals of which a positional relationship satisfies a predetermined condition, in association with the second image generated within a predetermined time from a date and time when the identification information is obtained, obtain an image generated by the first camera which images a periphery of the display, as the first image, obtain the one or the plurality of pieces of the identification information obtained by a wireless communication apparatus which is installed in a periphery of the first camera and obtain the identification information from the one or the plurality of electronic tags or portable terminals of which a positional relationship satisfies a predetermined condition, and cause the display to display the second image including a person included in the first image and being associated with the obtained identification information.

9. The information processing apparatus according to claim 8, wherein the at least one processor is further configured to execute the one or more instructions to, in a case where M persons (M is equal to or more than one) are included in the first image and N (N is equal to or more than one) pieces of the identification information are obtained, cause the display to display the second image including at least one person among the M persons and being associated with at least one of the N pieces of the identification information.

10. The information processing apparatus according to claim 9, wherein the at least one processor is further configured to execute the one or more instructions to, in a case where a plurality of persons having predetermined sizes or larger are included in the first image and N (N is equal to or more than one) pieces of the identification information are obtained, cause the display to display the second image including all of the plurality of persons having the predetermined sizes or larger included in the first image and being associated with at least one of the N pieces of the identification information.

11. An information processing method executed by a computer, the method comprising:

obtaining a first image captured by a first camera, the first image including a plurality of faces of a plurality of persons;

extracting, from a plurality of second images captured by one or more second cameras installed in a facility, a second image including at least two persons of the plurality of persons in the first image; and causing a display to display the second image including the at least two persons of the plurality of persons in the first image in one image.

12. A non-transitory storage medium storing a program causing a computer to:

obtain a first image captured by a first camera, the first image including a plurality of faces of a plurality of persons;

extracting, from a plurality of second images captured by one or more second cameras installed in a facility, a second image including at least two persons of the plurality of persons in the first image; and cause a display to display the second image including the at least two persons of the plurality of persons in the first image in one image.

* * * * *